Nov. 28, 1961 H. A. PRICE 3,010,580
FILTRATION EQUIPMENT
Filed May 29, 1959 3 Sheets-Sheet 3

INVENTOR:
HAROLD A. PRICE
BY
Arthur Middleton
ATTORNEY

United States Patent Office 3,010,580
Patented Nov. 28, 1961

3,010,580
FILTRATION EQUIPMENT
Harold A. Price, Lafayette, Calif., assignor to Permanent Filter Corporation, Los Angeles, Calif., a corporation of California
Filed May 29, 1959, Ser. No. 816,772
18 Claims. (Cl. 210—104)

The present invention relates to new and novel filtration equipment and more particularly to a filtering system especially adapted for fueling and defueling aircraft.

The fueling and defueling of modern aircraft, particularly of the jet type as well as guided missiles and the like, has presented certain critical problems when fueling or defueling procedures are carried out. In these types of vehicles, it is essential that the fuel be effectively filtered so as to remove not only a large percentage of the solid contaminants therein, but also to effectively perform a water-stripping operation to remove a large percentage of the water present in the fuel. The is a critical matter since the presence of solid contaminants or water in the fuel of jet aircraft or missiles often results in such malfunctioning of the engines that crashes and other accidents are the result.

The present system is particularly adapted for mounting upon a movable vehicle such as a small truck whereby the system may be moved to any location where it is desired to fuel an aircraft, for example. The fueling of aircraft presents certain problems which the invention is especially designed to solve. For example, in order to successfully fuel the aircraft and to produce a satisfactory functioning of the filter apparatus, a substantially constant outlet pressure must be maintained in the outlet hose through which the tanks of the aircraft are filled.

Additionally, it is important to measure the amount of fuel which is pumped to the aircraft during fueling procedures, and furthermore, the system should measure the amount of fuel which is pumped out of the aircraft during defueling procedures. In order to successfully perform such defueling procedures, the fuel should pass through the filter means in the same direction that the fluid flows through the filter means during fueling operations, and the fuel should also pass through the measuring means of the system in the same direction during fueling and defueling procedures since conventional fuel flow meters are only operative in one direction of fluid flow therethrough.

During fueling operations, the tanks must be topped off thereby requiring frequent shutting off of the fuel flow at the outlet nozzle, this sudden shutting off of the outlet nozzle producing surges in the system which have a tendency to create undesirable conditions in the system. The system according to the present invention accordingly provides means for shutting off the inlet flow to the filter means upon the occurrence of such surges as occur during topping off operations, for example.

As is well known, the filter means will eventually become blinded due to the accumulation of solid contaminants in the filter elements thereof. This blinding will produce an excessive pressure drop across the filter means, and upon the occurrence of this condition, additional means is provided in the invention system for automatically shutting off the system so as to enable the filter elements to be replaced or cleaned prior to pumping any additional fuel through the system.

The filter means of the present invention also includes a sump or a water trap for accumulating excess water which is stripped from the filtered fluid. This excess water is normally drained off from time to time as water accumulates in the sump. However, occasionally, a large slug of water will enter the filter means, whereupon the water level will rapidly increase in the sump whereupon an additional means is provided for shutting down the system until the excess water has been drained from the sump to insure that excessive water will not pass through the filter means and into the outlet of the system.

The means for producing substantially constant outlet pressures of the present invention includes a pressure regulator valve which is controlled by providing sensing means which senses the pressure both in the inlet conduit and the outlet conduit of the system, whereby the regulator valve is selectively opened and closed as the pressure varies in the outlet conduit to meter the flow of fluid into the filter means whereby a substantially constant outlet pressure is obtained. This sensing means for the regulator valve includes a feed back means connected with the outlet conduit, the feed back means including a pressure pilot valve which controls the fluid pressure on one side of a diaphragm actuating the regulator valve, the feed back conduit also being connected with a quick closing pilot valve which serves to permit the regulator valve to be quickly closed upon a sudden increase in pressure in the outlet conduit. The feed back means also includes a check valve and metering orifice for maintaining the pressure regulator and pressure pilot valve in certain positions for a given time interval to prevent hunting of the regulating system during rapid pressure changes in the outlet conduit.

The means for permitting the desired reverse flow through the system includes the pressure regulator and a control valve connected in the outlet conduit for controlling fluid flow through the outlet conduit. The reverse flow means also includes first and second check valves which are so connected as to be normally closed when fluid is being pumped from the inlet to the outlet, but which are open when fluid is pumped from the outlet conduit to the inlet conduit, the reverse flow through the system being in the proper direction through the filter means and the fluid flow measuring means of the system.

The control valve also comprises the means for shutting down the system when excess water accumulates in the sump, a control valve being connected with the sump of the filter means through a conduit, the flow through this conduit being controlled by a float actuated valve which is actuated in accordance with the water level in the sump.

The control valve serves the additional function of shutting the system down when the pressure drop across the filter means becomes excessive. This is accomplished by connecting the control valve with a differential valve which is in turn connected with the inlet conduit upstream of the filter means and with the outlet conduit downstream of the filter means. The differential valve will accordingly sense the pressure drop across the filter means and will control the actuation of the control valve so as to shut down the system when excessive pressure drop occurs across the filter means.

An object of the present invention is to provide new and novel filtration equipment which is adapted to separate free and entrained water and solid contaminants from fluid.

Another object is to provide a filtering system which is especially adapted for use in filtering the fuel during fueling and defueling operations of aircraft.

A further object of the invention is to provide a filtering system which provides a substantially constant outlet pressure and which automatically shuts down when surges occur due to turning the outlet nozzle off.

Yet another object of the invention is the provision of a filtering system which automatically shuts down when excess water accumulates in the filtering means thereof.

A still further object of the invention is to provide a filtering system which automatically shuts down when the pressure drop across the filter means exceeds a predetermined limit.

Still another object of the invention is to provide a filtering system which indicates the amount of fuel passing through the system both during fueling and defueling procedures.

Yet a further object of the invention is to provide a filtering system including filter means and a flow measurement means, the system being so arranged that the filtered fluid passes through the filter means and the flow measurement means in the same direction during both fueling and defueling procedures.

Another object of the invention is the provision of a filtering system which is relatively simple and inexpensive in construction, and yet which is efficient and reliable in operation.

Other objects and many attendant advantages of the invention will become more apparent when considered in connection with the specification and accompanying drawings, wherein:

Figure 1:
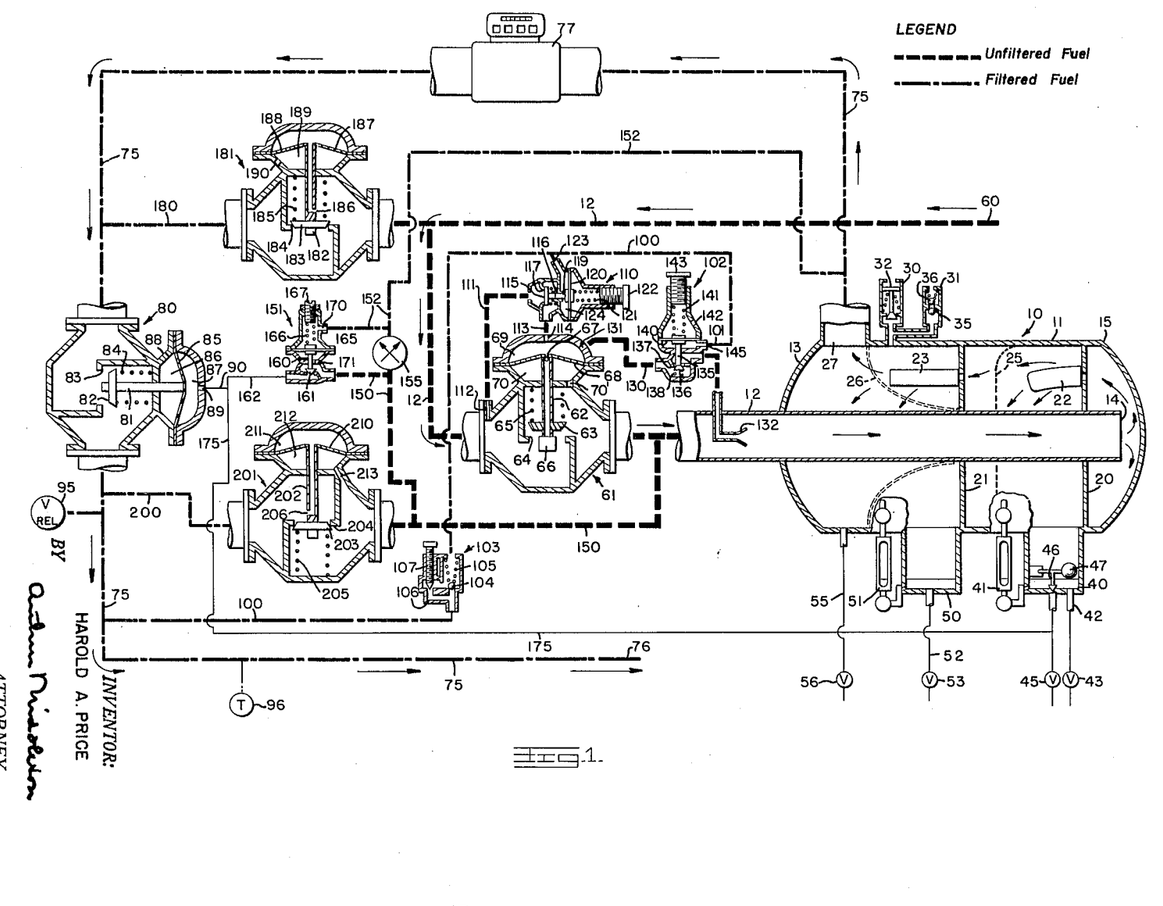
FIG. 1 is a schematic view of the equipment according to the present invention illustrating the relative positions of filtered and unfiltered portions of the fluid passing through the apparatus.
Figure 2:
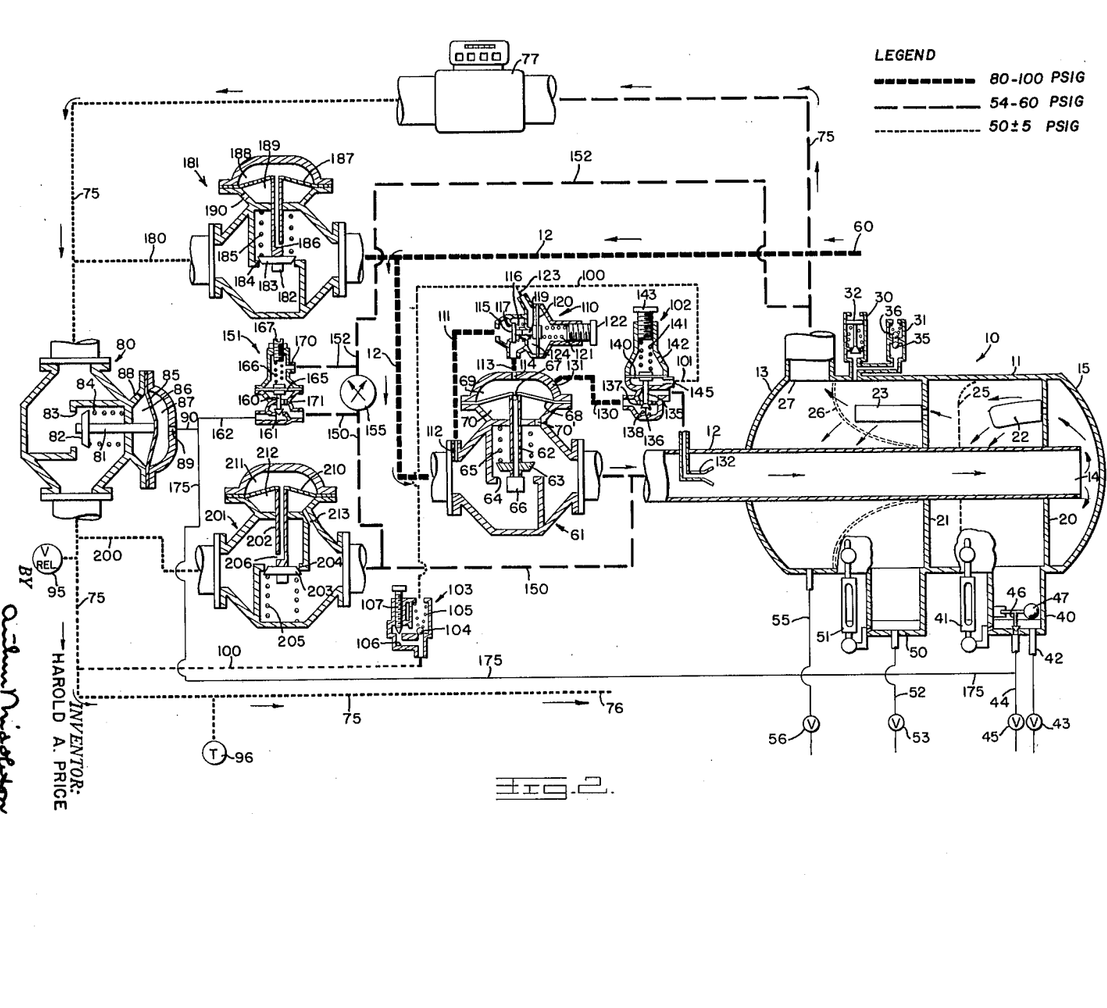
FIG. 2 is a schematic view similar to FIG. 1, illustrating the relative pressures existing in various parts of the system during normal fueling procedures.
Figure 3:
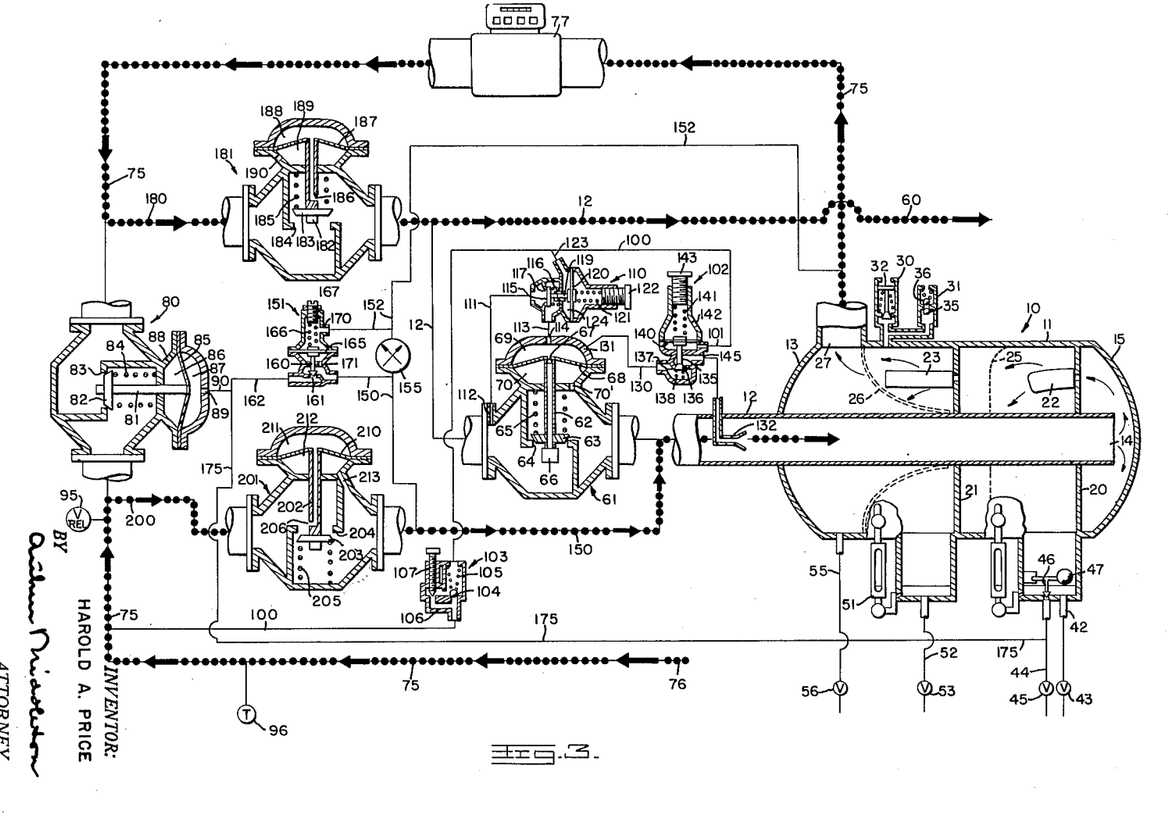
FIG. 3 is a schematic view similar to FIGS. 1 and 2 illustrating the flow of fluid through the system.

Referring now to the drawings wherein like reference characters designate corresponding parts throughout the several views, it should first be noted that in each of the three figures, the components are identical, the only difference being in the schematic illustration of the conduits showing the various conditions existing in the conduits and further illustrating the different positions of the valve mechanisms controlling the system.

As seen in each of the figures, the filter means of the device is indicated generally by reference numeral 10 and is preferably of the type shown in my copending application Ser. No. 789,682, the filter means being especially adapted for removing both solid contaminants and water from filtered fluid. The filter means comprises an outer casing 11, an inlet conduit 12 extending through one end portion 13 of the casing, the inlet conduit terminating at 14 and providing the inlet of the filter means. The end portion 15 of the tank preferably comprises a quick opening cover which is hinged to the remainder of the tank, the details of the construction being no part of the present invention, and the structure being shown only in a schematic manner.

Supported upon the inlet conduit which actually is in the form of a tube within the tank are a primary header 20 and a secondary header 21. A plurality of socks schematically indicated at 22 are supported by primary header 20, these socks being formed of a fabric type material and a plurality of coalescing units 23 is supported by the secondary header 21, the coalescing units including fiberglass or similar material adapted to provide a drop size propagating effect.

A primary barrier 25 comprises a special synthetic screen, the barrier being mounted intermediate the socks 22 and the secondary header 21. A secondary barrier 26 is mounted within the tank between the coalescing units 23 and the outlet 27 of the tank, the secondary barrier being preferably formed of a layer of fiberglass and a layer of treated nylon. The primary barrier serves to smooth out the fluid flow, while the secondary barrier serves as a safety strainer for separating the major portion of any water still in the fuel after the fuel has been processed by the other filter components.

Connected with the top of the tank is a vacuum breaker mechanism 30 and an air vent and check valve mechanism 31. The vacuum breaker includes a movable valve member 32 which is spring urged into closing position, whereby upon creation of a vacuum in the tank, the vacuum breaker valve member will move downwardly to vent the tank to atmosphere. A float ball 35 formed of buoyant material is mounted in the lower chamber of mechanism 31 and is adapted to float upwardly on the surface of fluid from the tank to prevent the fluid from escaping from the tank. A check ball 36 is spring urged downwardly to normally prevent loss of air from the tank, but if the air pressure builds up within the tank, ball 36 unseats to vent the tank to atmosphere.

A forward water trap 40 is disposed at the bottom of the tank downstream of the primary header 20, a sightglass 41 being provided for indicating the level of water within the sump as the stripped water accumulates within the sump or water accumulating means. A first conduit 42 having a manually operable valve 43 connected therein is in communication with the bottom of sump 40 for draining water from the sump and a second conduit 44 having a manually operable valve 45 connected therein is also in communication with the bottom of the sump. The upper end of conduit 44 is normally closed by a valve member 46 connected to a float 47, the float being of a selected buoyancy such that it floats on the water accumulated at the bottom of the sump and sinks within the filtered fluid. It is apparent that when the water accumulates beyond a certain point, float 47 will raise to open conduit 44 to the bottom of sump 40.

A second water trap or sump 50 is disposed at the bottom of the tank downstream of the secondary header, a sightglass 51 being provided for indicating the water level in the sump. A conduit 52 is in communication with the bottom of sump 50 and is provided with a manually operable valve 53 for selectively draining sump 50. A conduit 55 is connected with the lower rear portion of the tank and has a manually operable valve 56 connected therein for draining the rear portion of the tank which is normally disposed at the lowermost point since the tank is preferably at a slight angle such as three degrees from front to rear to assist in settling out of the water into the sumps.

Inlet conduit 12 as illustrated schematically extends to a point 60 from which it may extend to a source of fluid to be filtered such as a hydrant disposed at suitable locations at an airport or the like. Connected in the inlet conduit, which incidentally is shown schematically as containing only unfiltered fluid in FIG. 1, but as having fluids of different pressures in FIG. 2, is a pressure regulator valve 61, this valve being of the spring loaded diaphragm actuated type. Regulator valve 61 includes a movable valve portion 62 having a valve disc 63 adapted to seat upon a valve seat 64. A compression spring 65 normally urges the valve disc into seated position. A longitudinally extending bore is provided through valve member 62 and a strainer 66 is mounted at the bottom end of the valve stem. A ball check valve 67 is mounted within the upper portion of the hollow bore of valve member 62 and is adapted to seat when urged in a downward direction and unseat when urged upwardly. A diaphragm 68 is connected to the upper end of valve member 62 for actuating the valve member, an upper chamber 69 and a lower chamber 70 being disposed on either side of the diaphragm.

The outlet 27 of the filter tank is connected with an outlet conduit 75, the outlet conduit 75 extending to a point 76 where it may be connected to an outlet hose or similar means for facilitating fueling of the aircraft. Connected in the outlet conduit is a flow meter 77 of conventional type, this flow meter being a positive displacement meter which may incorporate a measuring unit with a four-digit direction reading meter and a seven-digit counter. A control valve 80 is connected in the outlet conduit downstream of meter 77, this control valve including a movable valve member 81 having a valve disc 82 which seats upon a valve seat 83. A compression spring 84 normally urges the valve member into a seating position, and the upper end of the valve member is connected to a diaphragm 85 defining a chamber 86 and a chamber 87 on either side thereof. Chamber 86 is vented to atmosphere through an opening 88, and chamber 87 is provided with an opening 89 which is in communication with a conduit 90.

A pressure relief valve 95 is connected in the outlet conduit downstream of the control valve. This valve may be of the diaphragm type which may be adjusted to relieve the system pressure at approximately 140 p.s.i. A fuel thermometer 96 is connected in the outlet conduit downstream of the pressure relief valve for measuring the outlet temperature of the fuel. Knowledge of the fuel thermometer is necessary when it is desired to compute the water out of solution.

A feed back conduit 100 has one end thereof connected to the outlet conduit downstream of the pressure relief valve, the feed back conduit extending to a point 101 wherein it is disposed in communication with a pressure pilot valve indicated generally by reference numeral 102 which will be more fully described hereinafter. Connected in the feed back conduit is a ball check and needle valve assembly indicated by reference numeral 103, this assembly including a ball check 104 normally urged downwardly by compression spring 105, whereby fluid pressure in the outlet conduit passing through the feed back conduit tends to unseat the ball check. A bypass 106 is provided for bypassing the ball check, a needle valve 107 being provided for obtaining a variable metering effect in the bypass passage as will be more fully explained hereinafter.

Also connected to the feed back conduit 100 is a quick closing pilot valve indicated generally by reference numeral 110. This quick closing pilot valve is connected in an auxiliary control conduit 111, one end portion 112 of which is in communication with the upstream side of the pressure regulator valve, the other end portion 113 thereof being in communication with an aperture 114 which opens into the upper chamber 69 of the diaphragm actuator of the pressure regulator. A movable valve member 115 is normally urged by a spring 116 into sealing engagement with a seat 117 for preventing fluid flow through auxiliary control conduit 111. The movable member 115 is maintained in closed position by a stop member 119 connected to a diaphragm 120. A compression spring 121 normally urges the diaphragm and stop member 119 into position for holding the valve member 115 in seated position. An adjustable member 122 is provided for varying the compression force of spring 121.

A conduit 123 provides communication between the feed back conduit 100 and the chamber 124 adjacent diaphragm 120. The pressure pilot valve 102 is connected in a regulator valve control conduit 130, one end of conduit 130 being in communication with an aperture 131 opening into the upper chamber 69 of the pressure regulator valve, the other end of the conduit 130 terminating in pitot tube 132 which is disposed in the central portion of inlet conduit 12 and opens downstream thereof.

Pressure pilot valve 102 includes a movable valve member 135 including a valve disc 136 adapted to seat on a valve seat 137, a compression spring 138 normally urging the valve member toward closed position. The upper end of valve member 135 is connected to a diaphragm 140, and a compression spring 141 normally urges the diaphragm 140 in a downward direction, an aperture 142 serving to vent the chamber above the diaphragm to atmosphere. An adjustable member 143 is provided for varying the compression force of spring 141. The end portion 101 of the feed back conduit is in communication with an aperture 145 which opens into the chamber beneath the diaphragm 140.

A first pressure conduit 150 is connected between the inlet conduit just upstream of the filter means and a differential valve indicated generally by reference numeral 151. A second pressure conduit 152 is connected between the outlet conduit just downstream of the filter means and the differential valve 151. It is apparent that the pressure existing at the inlet of the filter means will be present in conduit 150 and the pressure existing at the outlet of the filter means will exist in line 152. A differential gauge 155 is connected between conduits 150 and 152, the gauge being of the duplex type fitted with two pointers, one of which indicates the inlet fuel pressure and the second of which indicates the outlet fuel pressure of the filter means. The spread between the pointers indicates the amount of pressure drop across the filter tank.

Differential valve 151 includes a movable valve member 160 which seats upon a seat 161 for interrupting communication between conduit 150 and a conduit 162 which is connected with conduit 90. The upper end of valve member 160 is connected to a diaphragm 165, the diaphragm and valve member being normally urged in a downward direction by a compression spring 166, the compressive force of which is adjusted by means of an adjustable member 167.

The second pressure conduit 152 is connected to an opening 170 thereby providing communication with the upper chamber adjacent diaphragm 165, the lower chamber adjacent the diaphragm 165 being in communication with the first pressure conduit 150 through opening 171.

Conduit 90 leading from the chamber 87 of the actuating means of the control valve 80 is also in communication with a conduit 175 which communicates with conduit 44 leading from the forward trap 40 such that when valve member 46 unseats due to an excessive water accumulation in the forward water trap, water pressure will be applied through conduit 175 to the chamber 87 of the control valve.

A first reverse flow conduit 180 is connected between the inlet conduit upstream of the pressure regulator valve and to the outlet conduit just upstream of the control valve 80. A first check valve indicated generally by reference numeral 181 is connected in the first reverse flow conduit, check valve 181 including a movable valve member 182 having a valve disc 183 which seats upon a valve seat 184, a compression spring 185 normally urging the valve downwardly into sealing engagement. The valve stem of movable valve member 182 is hollow and a laterally extending aperture 186 is provided whereby fluid pressure from the inlet conduit passes upwardly to the hollow bore of the valve member. A diaphragm 187 is connected to the upper end of movable valve 182 and an upper chamber 188 is defined above the diaphragm, a lower chamber 189 being defined below the diaphragm. An aperture 190 vents the chamber 189 to atmosphere.

A second reverse flow conduit 200 is connected between the outlet conduit downstream of the control valve and the first pressure conduit 150 intermediate its connection to the inlet conduit and the differential valve 151. A second check valve 201 is connected in the reverse flow conduit 200, valve 201 including a movable valve member 202 having a valve disc 203 thereon adapted to seat on seat 204, a compression spring 205 normally urging the valve disc toward seating position. The valve stem of movable valve member 202 is hollow and a laterally extending opening 206 provides communication between the interior of the valve stem and the outlet conduit whereby the pressure of the outlet conduit passes through the bore in the valve stem.

The upper end of the movable valve member 202 as seen in the drawings is connected to a diaphragm 210, a chamber 211 being defined above the diaphragm and a chamber 212 being defined below the diaphragm, chamber 212 being in communication with the first pressure conduit 150 through an opening 213 provided in the valve body.

Referring to FIG. 1 of the drawings, the filtering action of the system is illustrated during normal operating procedures. The arrows indicate the normal direction of flow of fluid through the system, the fluid passing through the inlet conduit 12, through regulator valve 61, thence through the filtering tank, the outlet conduit 75, meter 77, control valve 80 and then on to the aircraft through the remaining portion of the outlet conduit and attached hose. During this normal filtering operation, check valve 181 and check valve 201 are maintained in closed position, and as seen in FIG. 1, the unfiltered fluid is present in the inlet conduit 60, the righthand portion of check valve 181, regulator valve 61, the first pressure conduit 150, and the righthand side of check valve 201. The unfiltered fluid also, of course, passes upwardly through the bore in movable valve member 62 into the upper chamber 69 of the regulator valve and through regulator valve control conduit 130 and back into the inlet conduit through pitot tube 132.

After the fluid passes through the outlet of the filter means, it is then in the form of completely filtered fluid, and this filtered fluid is present in the remaining portions of the system as indicated by the dot and dash lines. Of course, as the fluid passes through the filter means, it first becomes preliminarily filtered fluid as it passes through the socks 22 and the primary barrier 25, and then becomes a completely filtered and polished fluid after it passes through coalescing units 23 and secondary barrier 26.

At this point a further discussion of the filtering action of the filter means is in order to more clearly understand the operation of the present invention. The filter means employs an emulsion breaker principal which removes successively smaller sizes of solid materials as it passes through the filter components. The fluid passes through the inside layers of each of the strainer socks 22 from the inside to the outside thereof and during this passage, emulsified and free water is coalesced into free droplets. This drop growth continues along the outside of each sock until the droplets combine and become globules of sufficient mass to settle out of the fluid. In the case of jet fuel, for example, the water has a specific gravity of 1.0 compared with a specific gravity of approximately 0.78 for the fuel. The water settles rapidly and collects in the water traps from which it can be drained periodically as hereinafter discussed. The strainer socks strip approximately 80 percent of the moisture held in suspension and remove the major portion of the solid contaminants.

As the fuel passes through the primary barrier 25, excessive foaming is reduced, the fuel flow being smoothed out thereby permitting further water droplet separation. The fuel then passes through the coalescing units 23 from the inside thereof to the outside thereof wherein the fiberglass mats of the coalescing units produce additional water drop growth which causes the water to further settle out of the fuel while remaining solid contaminants are filtered out down to a size of approximately 2 microns.

As discussed previously, occasionally large quantities of water may be present in the fuel stream which cause a large slug of water to accumulate and flood the forward water trap. This action will raise the float 47 quickly to a level where valve member 46 opens the upper end of conduit 44. This will cause the water to enter the water sensing line 175 which produces a pressure in the chamber 87 of control valve 80 which closes control valve 80 and interrupts fuel flow through the system. The valve 80 will remain closed until the collected water in trap 40 is manually drained thus permitting the float to lower and again seat valve member 46. The remaining pressure in the sensing line 175 can then be further drained by means of valve 45 to permit control valve 80 to open under the influence of the normal fluid pressure existing in the system.

A typical normal operating condition is illustrated in FIG. 2, wherein the pressures in the various components of the system are indicated schematically by the lines of different characteristics on the drawing. It will be noted that a first pressure drop occurs across the regulator valve 61, and a second pressure drop occurs across the meter 77. While the pressures will vary in accordance with the desired operating characteristics, the values as shown herein represent ordinarily working conditions as presently employed. The unfiltered fuel enters the system at hydrant pressure in the range of approximately 80 to 100 p.s.i. up to a rate of about 600 gallons per minute flow. As the fuel enters the system under hydrant pressure, the initial fuel flow will open regulator valve 61 to permit passage of fuel into the filter tank. A small portion of this flow bleeds through the auxiliary control conduit 111 upstream of the regulator valve to enter the lefthand section of the quick closing pilot valve 110 as seen in the drawings.

At the same time, an even smaller amount of fuel bleeds upwardly through the bore in the hollow valve member 62 and enters the upper chamber 69 of the regulator valve. This fluid flow passes through the orifice defined by the seat of the ball check 67, the ball check 67 permitting flow upwardly into upper chamber 69.

At this point, it should be noted that the reduced pressure at the downstream side of the regulator valve 61 acts upon the lower surface of diaphragm 68 of the regulator valve since the lower chamber 70 of the regulator valve is in communication with the downstream side of the regulator valve through orifice 70'. Accordingly, the spring 65 and the higher pressure existing in the upper chamber 69 of the regulator valve tend to close the valve while the pressure in the lower chamber 70 and the inlet pressure acting on the under surface of valve disc 63 tend to open the valve. The opening and closing action of the regulator valve is determined by the pressure pilot valve as hereinafter described.

It should also be understood at this point that flow of fuel through auxiliary control conduit 11 is blocked by valve member 115 which is maintained in closed position by stop member 119 under the influence of spring 121.

The fluid downstream of the filter means passes through the meter 77, and the outlet pressure of approximately 50±5 p.s.i. existing in the outlet conduit downstream of the meter urges the control valve into open position since there is normally no pressure existing in chamber 87 of the control valve. The fuel then passes downstream of the control valve and the outlet pressure is transmitted through the feed back conduit 100 which unseats ball check 104 and passes upwardly into chamber 124 of the quick closing pilot valve 110 and into the lower chamber of the pressure pilot valve 102.

The outlet pressure existing in feed back conduit 100 is normally insufficient to actuate diaphragm 120 against the force of spring 121 and accordingly the quick closing pilot valve 110 remains closed as shown. The pressure pilot valve 102 is factory adjusted to provide an outlet pressure of approximately 50±5 p.s.i. As the pressure increases in the outlet conduit, the pressure will increase in the lower chamber of the pressure pilot valve thereby lifting the valve member 135 towards its closed position, the valve being normally urged toward open position by spring 141.

As the movable valve member 135 lifts toward the closed position, the opening between the valve disc 136 and the valve seat serves as a variable orifice to control the pressure in the upper chamber 69 of the regulator valve in conjunction with the fixed orifice bleed through the seat of the ball check in the hollow stem of the valve member 62 of the regulator valve. This intercooperation produces pressure balancing such that the regulator valve acts to modulate pressure rather than operating strictly in an on and off fashion, and accordingly, a stable and nearly constant pressure drop is maintained across the regulator such that a constant outlet pressure is obtained. The desired outlet pressure is finally obtained due to the pressure drop across meter 77.

It is evident that as the pressure in the outlet conduit increases, this increased pressure will pass backwardly through feed back conduit 100 into the lower chamber of the pressure pilot valve 102 causing the valve member 135 to move upwardly such that the orifice of the pressure pilot valve is decreased whereby the pressure will build up in chamber 69 of the reguator valve moving the valve toward closed position thereby reducing the flow through the regulator valve and causing a corresponding decrease in the outlet pressure of the system. In the opposite manner, a decrease in the outlet pressure causes the valve member 135 of the pressure pilot valve to be urged away from closed position to increase the size of the orifice thereby reducing pressure in chamber 69 of the regulator valve and causing the regulator valve member to move away from closed position to produce a corresponding increase in the outlet pressure of the system. Rapid pressure fluctuations which may exist in the outlet conduit would normally tend to cause excessive movement of the diaphragm of the pressure pilot valve such that hunting would occur, and this undesirable effect is prevented in the present invention by the ball check and needle valve assembly 103. Although increased pressure is transmitted readily through the ball check and needle valve assembly 103, upon seating of ball check 104 reverse flow through assembly 103 is damped by the passage of the fluid through the metering orifice defined by the needle valve 107. As discussed previously, topping off of fuel tanks causes sudden surges in the system due to rapid closing of the outlet nozzle. When the nozzle is closed against system flow, a resulting back-up pressure exists in the outlet conduit which is sensed through the feed back conduit 100. This pressure raises check ball 104 and the pressure at such time is great enough to actuate both the diaphragms 120 and 140 of the valves 110 and 102 respectively such that the valve member 135 of the pressure pilot valve is raised and completely seated while the stop member 119 moves to the right against the force of spring 121 as seen in the drawings. As stop member 119 moves to the right, the pressure existing in auxiliary control conduit 111 of the regulator valve will move valve member 115 to the right thereby dumping higher pressure fluid into the upper chamber 69 of the regulator valve. This action completely seats the valve disc 63 of the regulator valve and also seats the ball check 67 of the regulator valve, the seating of disc 63 completely interrupting flow of fuel through the remainder of the system.

As soon as the high pressure surge flow through the auxiliary control conduit 111 subsides, the portion 115 of the quick closing pilot valve serves as a check poppet and reseats under the influence of spring 116 and the pressure existing in upper chamber 69 of the regulator valve. Fuel will thereby be trapped in the upper chamber of the regulator valve under high pressure and will maintain the regulator valve closed. At the same time, check valve 104 of the ball check and needle valve assembly will have reseated itself whereby pressure will bleed backwardly through the feed back conduit to the outlet conduit slowly due to the metering effect of needle valve 107. It will ordinarily take approximately 20 seconds for the fluid pressure to bleed back through the ball check and needle valve assembly to the point where the pressure pilot valve 102 will again reopen for operating condition, and the stop member 119 of quick closing pilot valve 110 will return to its position as shown in the drawings. If the outlet nozzle is immediately reopened, the pressure will bleed out of feed back conduit 100 at a slightly greater rate, but a time interval of 15 seconds will still be required to again allow the pressure regulator valve to open for normal operation. This time interval is required in order to provide proper damping of the pressure regulator system and to prevent opening and closing oscillations in the system.

As discussed previously, excessive accumulations of water in trap 40 opens float valve 46, 47 and closes the control valve 80 interrupting flow through the outlet conduit. When this flow ceases, there is no longer sufficient differential pressure to hold the regulator valve open, and accordingly, the regulator valve closes and remains closed until the control valve reopens after bleeding off the pressure in sensing conduit 175.

The differential valve 151 is factory adjusted so that it normally remains closed as long as the pressure drop across the filter means does not exceed 8 p.s.i. As the filter elements of the filter means become blinded and clogged during operation, the pressure in the second pressure conduit 152 decreases with respect to that in the first pressure conduit 150. When the differential in pressure exceeds 8 p.s.i. in these two conduits, the force of the spring 166 is overcome and the diaphragm 165 moves upwardly to open valve member 160. Fuel is dumped from the second pressure conduit 150 into conduit 162 and thence through conduit 90 into the chamber 87 of the control valve 80. This will automatically close the control valve 80 thereby interrupting flow through the outlet conduit. The filter means is then disassembled and the filter elements thereof either cleaned or replaced in order to then obtain a satisfactory pressure drop across the filter means. After replacing the filter means, the pressure in chamber 87 of the control valve may be released by opening drain valve 45 to vent chamber 87 through conduit 175.

Referring now to FIG. 3 of the drawings, the system is shown with the components in a position obtained when the de-fueling operations are carried out. When it is desired to defuel aircraft, the fluid is pumped from the aircraft back through the outlet conduit of the apparatus and thence to the hydrant which is connected to the inlet conduit. The hydrant pump is normally operated in reverse to produce this defueling operation, and the water traps are drained whenever the sightglasses are about ¾ full. When the tanks of the aircraft are empty, the outlet hose is closed, and upon collapse of the inlet hose or when it becomes limp, the defueling operation has been substantially completed and the hydrant pump may be stopped. As seen in FIG. 3, the fuel flows in a reverse direction through the outlet conduit and firstly enters the control valve 80. The spring 84 of the control valve normally holds the valve in closed position and the pressure of the fuel flowing in a reverse direction further tends to seat the valve whereby the control valve remains firmly seated during the complete defueling operation.

The fuel then passes through the second reverse flow conduit 200 and into the second check valve 201. The fuel will flow upwardly through the hollow bore in the stem of the movable valve member of the second check valve into the upper chamber 211. This pressure will overcome the force of spring 205 and open the valve member. As the fuel flows downstream of the second check valve, a reduced pressure or vacuum effect is obtained in the lower chamber 212 due to the flow of the fluid, and this differential in pressure acting upon diaphragm 210 causes the valve member to open still further thereby positively maintaining the second check valve 201 open during the defueling operation.

The fuel then flows through the first pressure conduit 150 and into the inlet conduit downstream of the regulator valve. The regulator valve is normally biased to closed position by spring 65, and the regulator valve will tend to remain closed since there is not sufficient differential pressure to open the valve, and furthermore, the pressure of the fuel will act on the top of the valve disc 63 to maintain the regulator valve in its seated position.

Since the regulator valve remains closed, the fuel flows through the inlet tank in the same direction in which it flows during fueling procedures, the fuel then flowing through the outlet conduit and through the meter 77 whereby the amount of fuel passing through the system during defueling procedures may also be effectively measured.

The filtered fluid then passes into the first check valve 131 where it acts upon the lower surface of the valve disc 183 thereof to unseat the valve against the force of spring 185. As the fluid flows downstream of the first check valve, a vacuum effect is produced in chamber 188, whereas chamber 189 is vented to atmosphere thereby creating a pressure differential on diaphragm 187 which tends to further open the first check valve. In this manner, the first check valve is maintained in open position throughout the defueling procedure, and the fuel passes from the first check valve outwardly through the inlet conduit and back to the hydrant pump.

It will be noted that the first and second check valves are maintained in closed position during fueling operation and are maintained in open position during defueling operations, whereas the regulator valve and control valve are normally open during fueling procedures and are maintained closed during defueling procedures. The arrangement for interconnection of the components and their respective conduits is such that the fluid passes through the filter means and through the meter means 77 in the same direction during both fueling and defueling operations thereby causing these components to operate in the proper manner during each of such procedures.

The arrangement of the system for defueling is additionally advantageous since a low resistance path is provided for reverse flow such that the fuel may pass through the system in defueling with as little as 5 p.s.i. pressure drop across the unit.

It is evident that the pressure regulating means of the system including the pressure regulator valve, the quick closing pilot valve, and the ball check and needle valve assembly functions primarily to maintain a constant outlet fuel pressure to the aircraft regardless of the inlet flow rate from the hydrant. In addition, the pressure regulating means functions to sense shock waves or outlet nozzle shut off surge conditions and immediately shut down the system in an automatic manner thereby limiting the peak pressure rise in the system. The pressure regulator valve also serves as a check valve when defueling is taking place or when the unit is inoperative. The operation of the regulator valve as a check valve when the system is inoperative permits the filter tank and the outlet hose to be kept filled with fuel while the unit is inoperative, thereby permitting rapid functioning of the apparatus when it is again brought into operating condition.

It is apparent from the foregoing that there is provided new and novel filtration equipment which is adapted to separate free and entrained water and solid contaminants from filtered fluid, and which is especially adapted for use in fueling and defueling aircraft or missiles.

The system according to the present invention provides a substantially constant outlet pressure regardless of variations of the rate of flow into the inlet of the system and the system includes means for auomatically shutting down the system when excessive pressure surges occur therein. The system also includes means for automatically shutting down the system either when an excess amount of water accumulates in the water trap thereof, or when the pressure drop across the filter means becomes excessive. Means is provided for indicating the amount of fuel passing through the system, and a defueling arrangement is provided which permits the fuel to pass through the system in such a manner that it passes through the filter means of the flow meter in the same direction during defueling as occurring during fueling operations.

The system is relatively simple and inexpensive in construction, and yet is quite simple and reliable in operations.

As this invention may be embodied in several forms without departing from the spirit or essential characteristics thereof, the present embodiment is therefore illustrative and not restrictive, and since the scope of the invention is defined by the appended claims, all changes that fall within the metes and bounds of the claims or that form their functional as well as conjointly cooperative equivalents are therefore intended to be embraced by those claims.

I claim:

1. Filtration equipment comprising an inlet conduit adapted to be connected to a source of fluid to be filtered, a pressure regulator valve connected in said inlet conduit, filter means having an inlet and and an outlet, said inlet conduit being connected to the inlet of said filter means and providing the sole means of supplying fluid to be filtered to said filter means, an outlet conduit, the outlet of said filter means being connected to said outlet conduit, means normally biasing said pressure regulator valve toward closed position, said pressure regulator valve when in closed position preventing all flow of fluid to be filtered into the filter from said inlet conduit and from a source of fluid to be filtered, said pressure regulator valve also including a diaphragm for actuating the valve toward open and closed positions, and feed back means connected with said outlet conduit and operatively associated with said diaphragm for governing the operation of the pressure regulator valve to maintain a substantially constant outlet pressure in the outlet conduit, and a regulator valve control conduit having one end thereof in communication with one side of said diaphragm and the other end thereof in communication with said inlet conduit downstream of the pressure regulator valve, said feed back means including a variable orifice connected in said control conduit.

2. Apparatus as defined in claim 1, wherein said variable orifice includes a movable valve member, a diaphragm connected to said last-mentioned valve member, and said feed back means including a feed back conduit having one portion thereof in communication with said outlet conduit and another portion thereof in communication with one side of said last-mentioned diaphragm for controlling operation of said variable orifice.

3. Filtration equipment including a filter means having an inlet and an outlet, an inlet conduit connected to the inlet of said filter means, an outlet conduit connected to the outlet of said filter means, pressure regulator valve means connected in said inlet conduit, resilient means normally urging said pressure regulator valve toward closed position, said pressure regulator valve including diaphragm means for actuating the valve, means providing communication between one side of the pressure regulator valve and one side of said diaphragm means, and a regulator valve control conduit being in communication with said one side of the diaphragm means and providing communication with said inlet conduit downstream of the pressure regulator valve, and feed back means connected to said outlet conduit, said feed back means including variable orifice means connected in said regulator valve control conduit for governing fluid flow through said control conduit.

4. Apparatus as defined in claim 3, wherein said variable orifice means includes a movable valve member, resilient means normally biasing said movable valve member in one direction, and diaphragm means for moving said valve member in the opposite direction, said feed back means including a feed back conduit having one portion disposed in communication with said last-mentioned diaphragm means and having another portion thereof disposed in communication with said outlet conduit.

5. Apparatus as defined in claim 4, including a needle and check valve assembly disposed in said feed back conduit for regulating flow of fluid through the feed back conduit.

6. Apparatus as defined in claim 3, including an auxiliary control conduit providing communication between the upstream side of said pressure regulator valve and said other side of the diaphragm of the pressure regulator valve, and a quick closing pilot valve connected in said last-mentioned conduit for controlling flow of fluid through the conduit.

7. Apparatus as defined in claim 6, wherein said quick closing pilot valve is normally biased toward closed position and includes a movable portion, a diaphragm operating means connected to said movable portion for moving the portion to a position permitting opening of the quick closing pilot valve, and said feed back conduit being in communication with one side of said last-mentioned diaphragm.

8. Filtration equipment comprising an inlet conduit adapted to be connected to a source of fluid to be filtered, filter means having an inlet and an outlet, said inlet conduit being connected to the inlet of the filter means, an outlet conduit connected to the outlet of the filter means, a control valve connected in said outlet conduit for controlling the flow of fluid through the outlet conduit, said filter means including means for separating water from fluid filtered therethrough, said filter means including means for accumulating the separated water, said control valve including diaphragm means for moving the control valve toward and away from closed position, a conduit connecting said accumulating means with one side of said diaphragm means, valve means for controlling flow of fluid through said conduit, and water level sensing means operatively connected to said last-mentioned valve means for opening and closing the last-mentioned valve means in accordance with the level of the accumulated water within said accumulating means.

9. Apparatus as defined in claim 8, including means for selectively draining said water accumulating means and said conduit for releasing the pressure in said conduit after water has accumulated to an excessive level.

10. Filtration equipment including an inlet conduit, filter means including an inlet and an outlet, said inlet conduit being connected to the inlet of said filter means, an outlet conduit connected to the outlet of said filter means, a control valve connected in said outlet conduit for controlling fluid flow through the outlet conduit, a differential valve, said differential valve including a valve member, diaphragm means controlling movement of said valve member, a first pressure conduit being connected in communication with one side of said diaphragm and being in communication with said inlet conduit, a second pressure conduit being connected in communication with the opposite side of said diaphragm and being in communication with said outlet conduit, said differential valve also being connected to said control valve whereby upon an excessive pressure differential between the pressure in the inlet conduit and the outlet conduit produces movement of the diaphragm so as to open the valve member of the differential valve and supply fluid to the control valve for closing the control valve and interrupting fluid flow through said outlet conduit.

11. Apparatus as defined in claim 10, wherein said differential valve includes resilient means normally biasing the valve member toward closed position, the first pressure conduit connected with the inlet conduit being in communication with the side of the diaphragm opposite to the resilient means so that pressure within the first pressure conduit urges the valve member toward open position.

12. Filtration equipment comprising an inlet conduit adapted to be connected to a source of fluid to be filtered, filter means including an inlet and an outlet, said inlet conduit being connected to the inlet of the filter means, and outlet conduit connected to the outlet of said filter means, a regulator valve connected in said inlet for controlling fluid flow through said inlet conduit to the filter means, a control valve connected in said outlet conduit for controlling fluid flow through said outlet, a first reverse flow conduit connected between said inlet conduit upstream of said regulator valve and said outlet conduit upstream of said control valve, a first check valve connected in said first reverse flow conduit, a second reverse flow conduit connected between said inlet conduit downstream of said regulator valve and said outlet conduit downstream of said control valve, means normally biasing each of said valves to closed position, said valves being constructed and arranged to permit reverse flow from the outlet conduit to the inlet conduit through said first and second check valves while maintaining the regulator valve and the control valve in said position such that the flow through the filter means is in the same direction when the filtered fluid is being urged through the system from the inlet conduit to the outlet conduit.

13. Filtration equipment defined in claim 12, wherein said control valve includes a movable valve member, diaphragm means connected to said valve member for actuating it toward and away from closed position, a differential valve for sensing pressure drop across the filter means, said differential valve including a movable valve member, diaphragm means for actuating said valve member, a first pressure conduit being in communication with one side of the differential valve diaphragm and also being in communication with said inlet conduit upstream of said filter means, a second pressure conduit being in communication with the other side of said differential valve diaphragm and also being in communication with said outlet conduit downstream of said filter means, and a conduit being connected to said differential valve and one side of the control valve diaphragm, the valve member of the differential valve serving to connect or disconnect one of said pressure conduits and said last-mentioned conduit.

14. Filtration equipment comprising an inlet conduit adapted to be connected to a source of fluid to be filtered, filter means having an inlet and an outlet, said inlet conduit being connected to the inlet of said filter means, an outlet conduit connected to the outlet of said filter means, a pressure regulator valve connected in said inlet conduit, said pressure regulator valve including a valve member, resilient means normally urging said valve member to closed position, diaphragm means connected to said valve member for actuating the valve member toward and away from closed position, means providing communication between one side of said diaphragm means and the upstream side of said inlet conduit such that pressure within the inlet conduit upstream of the regulator valve tends to closed the valve member, a control conduit providing communication between said one side of the diaphragm means and said inlet conduit downstream of the regulator valve, a pressure pilot valve connected in said control conduit, said pressure pilot valve including a valve member, means normally biasing said last-mentioned valve member in one direction, diaphragm means connected to said last-mentioned valve member for actuating the valve member, a feed back conduit providing communication between one side of said last-mentioned diaphragm means and said outlet conduit, a check valve mounted in said feed back conduit and permitting flow from said outlet conduit to said pressure pilot valve and preventing flow from said pressure pilot valve to said outlet conduit, and a bypass conduit bypassing said check valve, a metering orifice being provided in said bypass conduit.

15. Apparatus as defined in claim 14, including an auxiliary control conduit providing communication between said one side of the diaphragm means of the regulator valve and said inlet conduit upstream of the regulator valve, and a quick closing pilot valve connected in said auxiliary control conduit, diaphragm means controlling the operation of said quick closing pilot valve, and conduit means providing communication between said last-mentioned diaphragm means and said feed back conduit, said last-mentioned conduit being connected in said feed back conduit intermediate said check valve and said pilot valve.

16. Apparatus as defined in claim 15, wherein said quick closing pilot valve includes a valve member movable with respect to said diaphragm means, said diaphragm means being connected to a stop member adapted to engage said last-mentioned movable valve member for controlling operation of the movable valve member.

17. Apparatus as defined in claim 14, including a control valve connected in said outlet conduit, a differential valve, said differential valve being connected to the inlet conduit upstream of the filter means and also being connected to the outlet conduit downstream of the inlet means, said differential valve being connected with the control valve for actuating the control valve and interrupting fluid flow through the outlet conduit.

18. Apparatus as defined in claim 17, wherein said filter means includes means for stripping the water from fluid filtered therethrough, means for accumulating separated water in the filter means, an excess water conduit providing communication between said water accumulating means and said control valve, and water level sensing valve means for controlling the fluid flow through said last-mentioned conduit to cause the control valve to close upon the accumulation of excess water in the water accumulating means.

References Cited in the file of this patent

UNITED STATES PATENTS

| | | |
|---|---|---|
| 624,777 | Fausek | May 9, 1899 |
| 2,469,293 | Davidson | May 3, 1949 |
| 2,664,170 | Walker et al. | Dec. 29, 1953 |
| 2,698,717 | Sisco | Jan. 4, 1955 |